(12) United States Patent
McMillan (10) Patent No.: US 8,650,966 B2
(45) Date of Patent: Feb. 18, 2014

(54) STRAIN GAUGE ASSEMBLY AND METHOD

(75) Inventor: Alison J. McMillan, Uttoxeter (GB)

(73) Assignee: Rolls-Royce plc, London (GB)

( * ) Notice: Subject to any disclaimer, the term of this patent is extended or adjusted under 35 U.S.C. 154(b) by 223 days.

(21) Appl. No.: 13/038,830

(22) Filed: Mar. 2, 2011

(65) Prior Publication Data

US 2011/0219883 A1    Sep. 15, 2011

(30) Foreign Application Priority Data

Mar. 15, 2010   (GB) .................................. 1004224.0

(51) Int. Cl.
*G01B 7/16*      (2006.01)

(52) U.S. Cl.
USPC ............................................................ 73/767

(58) Field of Classification Search
USPC .......................................... 73/760, 767, 801
See application file for complete search history.

(56) References Cited

U.S. PATENT DOCUMENTS

| | | | |
|---|---|---|---|
| 3,994,598 A * | 11/1976 | Reytblatt ........................ | 356/34 |
| 5,877,039 A * | 3/1999 | Tanizawa ........................ | 438/53 |
| 6,748,810 B2 * | 6/2004 | Christensen et al. ........... | 73/795 |
| 6,986,287 B1 | 1/2006 | Dorfman | |
| 7,096,748 B2 * | 8/2006 | Kutlu ........................ | 73/862.474 |
| 7,555,960 B2 * | 7/2009 | Nakano et al. .................. | 73/781 |
| 2007/0018083 A1 | 1/2007 | Kumar et al. | |
| 2007/0095160 A1 | 5/2007 | Georgeson et al. | |
| 2007/0240524 A1 * | 10/2007 | Speckhart et al. ........ | 73/862.381 |
| 2007/0255424 A1 | 11/2007 | Leydet et al. | |
| 2007/0279180 A1 * | 12/2007 | Sugimoto et al. ................. | 338/2 |
| 2008/0223152 A1 | 9/2008 | Georgeson et al. | |

FOREIGN PATENT DOCUMENTS

| | | |
|---|---|---|
| FR | 2 603 378 A1 | 3/1988 |
| FR | 2 667 150 A1 | 3/1992 |
| GB | 1148877 | 4/1969 |
| WO | WO 02/44655 A1 | 6/2002 |
| WO | WO 03/008243 A1 | 1/2003 |
| WO | WO 2009/142630 A1 | 11/2009 |

OTHER PUBLICATIONS

European Search Report issued in European Patent Application No. 11156656 dated Jun. 20, 2011.
Search Report issued in corresponding British Application No. GB 1004224.0 dated Jul. 28, 2010.

* cited by examiner

*Primary Examiner* — Max Noori
(74) *Attorney, Agent, or Firm* — Oliff PLC (57) ABSTRACT

A strain gauge assembly is disclosed, including a plurality of strain gauges arranged in a side-by-side relationship, each having a first end and a second end. The first and/or second end of one of the plurality of strain gauges is offset from a corresponding first and/or second end of another of the plurality of strain gauges.

25 Claims, 5 Drawing Sheets

STRAIN GAUGE ASSEMBLY AND METHOD

The present invention relates to a strain gauge assembly and method, and particularly but not exclusively to an assembly and method for measuring a stress wave in a composite material.

BACKGROUND

A strain gauge typically comprises a conductor, such as a thin foil, arranged in a serpentine pattern. The pattern is such that the conductor extends along a length and doubles back on itself. This is repeated to form a plurality of parallel lengths.

The conductor is conventionally laid upon a flexible backing layer made from an insulative material. The backing layer isolates the conductor from a test component in which strain is to be measured. However, where the test component itself is an insulative material, the backing layer may be omitted. The strain gauge is affixed to the test component using an adhesive or other means of fixation.

The resistance of the conductor is measured in order to determine the strain of the test component. The resistance of the conductor varies depending on whether it is under compression or tension. When in compression, the length of the conductor decreases and its thickness increases, thus decreasing the resistance measured. Conversely, when in tension, the length of the conductor increases and its thickness decreases, which increases the resistance measured.

The change in length and thickness undergone during strain is experienced along each of the lengths of the conductor. Consequently, the change in resistance is multiplied by the number of lengths in the serpentine pattern. Therefore, the pattern amplifies the change in resistance measured, thus making the gauge far more sensitive.

Two strain gauges may be used to obtain a full surface 2D strain field. To achieve this, the two strain gauges are arranged perpendicular to each other. To improve the accuracy of this method, a third strain gauge may be included at an angle of 45 degrees to the other two strain gauges. This accounts for any misalignment between the strain gauges.

To improve the accuracy of the measurements, a "rosette" of strain gauges may be used to cancel out any voltage/current effects. Essentially, a strain gauge works as a variable resistor, and therefore they may be used to form a Wheatstone bridge. This provides a more sensitive and accurate measurement.

Generally, strain gauges are used for measuring strains that are slowly varying across the surface of the test component, and where the surface stresses are reasonably representative of the stresses that would be seen on the inside of the material of the component.

A component constructed from a composite material displays a different local strain adjacent to a fibre than in a region between fibres. It is conventional to use a larger strain gauge than usual, covering a large area of material, so as to average out such local strain variations. However, this is recognised to be a crude approach with limited value since it does not provide a detailed picture of the strain field across the surface.

It is an object of the present invention to seek to provide an improved strain gauge assembly.

STATEMENTS OF INVENTION

In accordance with an aspect of the invention there is provided a strain gauge assembly comprising: a plurality of strain gauges arranged in a side-by-side relationship, each having a first end and a second end; wherein the first and/or second end of one of the plurality of strain gauges is offset from a corresponding first and/or second end of another of the plurality of strain gauges.

For a single strain gauge, there is no means to differentiate between a long duration low amplitude wave and a shorter duration high amplitude wave. The present invention allows the duration of the wave to be determined, providing an indication of the amplitude of the wave.

The present invention may be particularly useful for investigating the propagation of shock wave fronts through a composite material, especially through thickness shock.

A specific application of the invention may be in a split Hopkinson bar test.

The plurality of strain gauges may be individual components and may be arranged by hand on the test component. The strain gauges may be arranged using simple positioning tools. Alternatively, the strain gauges may be integrally formed to allow easy positioning of the strain gauges on the test component.

The plurality of strain gauges may be substantially parallel with one another.

The offset may be a predetermined distance.

Each of the plurality of strain gauges may be of the same length.

The offset may be a fraction of the length of the gauges. For example the offset may be ½, ⅓, ⅖, . . . n/m . . . of the length of the gauges. Alternatively, the offset may be random.

The strain gauge assembly may further comprise a flexible backing layer, and the plurality of strain gauges may be mounted on the backing layer.

The backing layer may comprise an alignment feature for aligning the strain gauge assembly with an axis of a test component.

The alignment feature may comprise two parallel features on the backing layer which may align when the strain gauge assembly is aligned with the axis of the test component.

The parallel features may be sides of the backing layer.

The parallel features may be markings on the backing layer.

The parallel features may be aligned parallel or perpendicular to an axis of the plurality of strain gauges extending between the first and second ends.

The strain gauge assembly may further comprise a signal processor which processes signals from the plurality of strain gauges.

The signal processor may add or subtract the signals from the plurality of strain gauges.

The signal processor may determine properties of a stress wave in a test component.

The properties of the strain wave determined by the signal processor may be one or more of: speed, duration, amplitude, shape, group velocity, phase velocity and dispersion relation.

The signal processor may be powered by a stress wave, which may be the stress wave that is being measured, or energy stored from previous stress waves.

The assembly may further comprise a transmitter which transmits signals from the plurality of strain gauges to a receiver.

The signals may be the raw signals from the strain gauges, the processed signals and/or the determined properties of the wave.

The transmitter may be powered by a stress wave, which may be the stress wave that is being measured, or energy stored from previous stress waves.

The transmitter may send the signals by radio or other wireless technology to a remote receiver. For example the remote receiver may be a computer in an aircraft cockpit, or a computer on the test bed. Alternatively, the transmitter may send the signals down a wired connection to the remote receiver. The signals may be collated or stored before transmission which may be in real-time or at intervals.

The signal processing algorithms may be built as hardware within the same circuit as the strain gauges, and this may have potential to be embedded or attached to components that are not only used for test, but also during their service lives for monitoring the loading conditions in real time.

One or more strain gauge assemblies may be used to form a strain gauge rosette. The rosette may contain the strain gauge assembly of the present invention and standard strain gauges.

The strain gauge assembly may be printed onto the component.

For particular classes of test or in-service component, the strain gauge assembly and associated circuitry may be printed directly onto the surface (or subsurface during earlier manufacturing phase) of the component. This may be applicable to the manufacture of parts made from non-electrically conducting material. It may also be applicable to parts where a part of the component is non-electrically conducting. It may also be applicable if an insulating layer may be laid down prior to and after the printing of the strain gauge and associated electronics. Such applications may include: a composite fan blade, a composite containment casing, a composite guide vane, a composite structure or a composite shaft. These are all components for which extreme service loads (bird strike, Fan Blade Off (FBO) or Foreign Object Damage (FOD) events) and extreme consequences (e.g. High Cycle Fatigue (HCF) failure following an unanticipated damage event, leading to failure of a critical component) need to be monitored. The strain gauge assembly may be embedded during the lay-up of a composite component, which may ensure precise positioning of the assembly based on the precision of the manufacturing geometric control systems.

In accordance with another aspect of the invention there is provided a method for determining strain properties in a test component, the method comprising: providing a plurality of strain gauges, each having a first end and a second end; arranging the plurality of strain gauges on the test component in a side-by-side relationship such the first and/or second end of one of the plurality of strain gauges is offset from a corresponding first and/or second end of another of the plurality of strain gauges.

The method may further comprise processing signals from the plurality of strain gauges.

Processing the signals may comprise adding or subtracting the signals from the plurality of strain gauges.

Processing the signals may comprise determining properties of a stress wave in the test component.

The properties of the strain wave determined may be one or more of: speed, duration, amplitude, shape, group velocity, phase velocity and dispersion relation.

BRIEF DESCRIPTION OF THE DRAWINGS

For a better understanding of the present invention and to show more clearly how it may be carried into effect, reference will now be made, by way of example, to the accompanying drawings, in which:—

DETAILED DESCRIPTION

Figure 1:
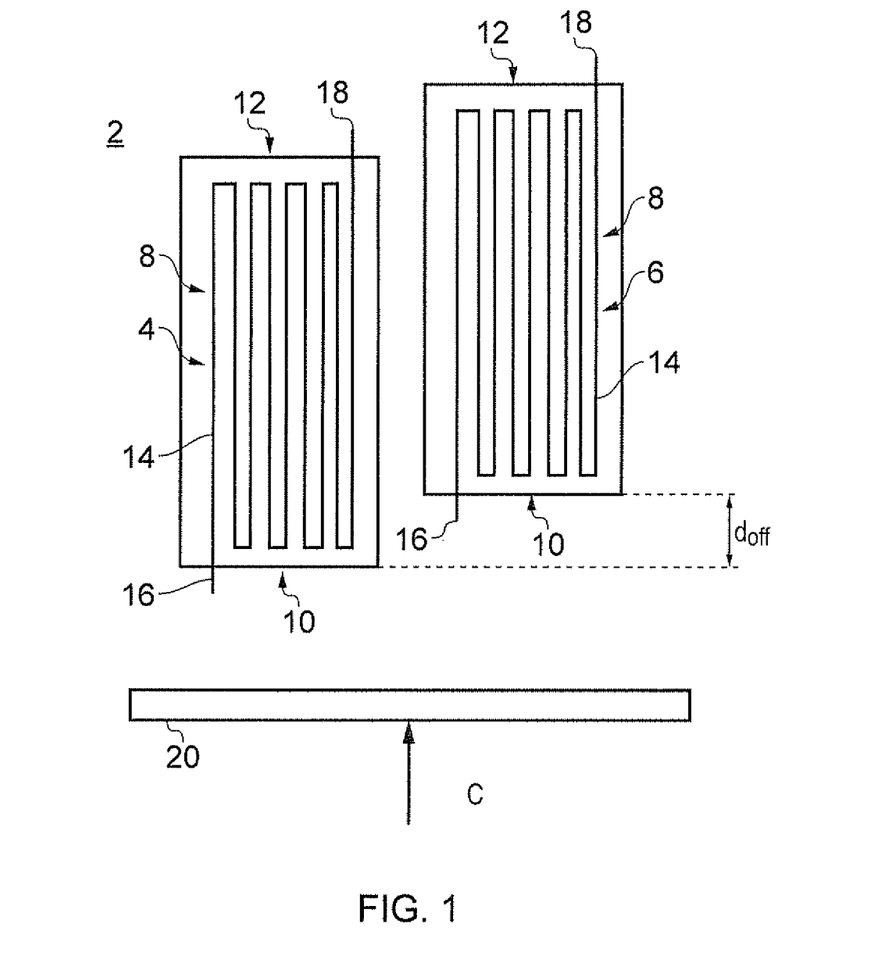
FIG. 1 is a plan view of a strain gauge assembly in accordance with an embodiment of the invention comprising first and second strain gauges, with a wave pulse approaching.

FIG. 1 shows a strain gauge assembly 2 in accordance with an embodiment of the invention. The strain gauge assembly 2 comprises a first strain gauge 4 and a second strain gauge 6.

Each of the first and second strain gauges 4, 6 consists of a flexible backing layer 8 made from an insulative material. The backing layer 8 is substantially rectangular and has a first end 10 and a second end 12 each corresponding to a short side of the backing layer 8.

A conductor 14, such as a thin foil, is laid down on top of the backing layer 8. The conductor 14 has a first end 16 and a second end 18, and is arranged in a serpentine pattern between the first and second ends 16, 18. In the preferred arrangement the pattern is such that the conductor 14 extends from the first end 10 of the backing layer 8 along substantially the entire length of a long side of the backing layer 8 and doubles back on itself before running back towards the second end 12 of the backing layer 8. This is repeated to form a plurality of parallel lengths. Other arrangements may be used, for example doubling up the conductor so that any AC induction effects are minimised at the turns. Doubling up enables a spiral arrangement to be used including a range of other multiple spirals.

The resistance of the conductor 14 is measured between the first and second ends 16, 18 of the conductor 14 in order to determine the strain of the test component. The first and second strain gauges 4, 6 are connected to a signal processor (not shown) which monitors the output of the first and second strain gauges 4, 6 and combines and processes the individual signals from the first and second strain gauges 4, 6.

The backing layer 8 isolates the conductor 14 from a test component (not shown) in which strain is to be measured. However, where the test component itself is an insulative material, the backing layer may be omitted. The strain gauge assembly 2 is affixed to the test component using an adhesive or other means of fixation, or "printed" on directly for example using techniques like vapour depositioning or from an "ink-jet" printhead.

The first and second strain gauges 4, 6 are arranged in a side-by-side relationship with one of the long sides of the first strain gauge 4 facing one of the long sides of the second strain gauge 6. The first and second strain gauges 4, 6 are arranged so that they are substantially parallel with one another.

The first and second strain gauges 4, 6 are offset from one another such that the corresponding first and second ends 10, 12 of the first and second strain gauges 4, 6 are not in alignment. The first and second strain gauges 4, 6 are offset by a known distance $d_{off}$.

Figure 2:
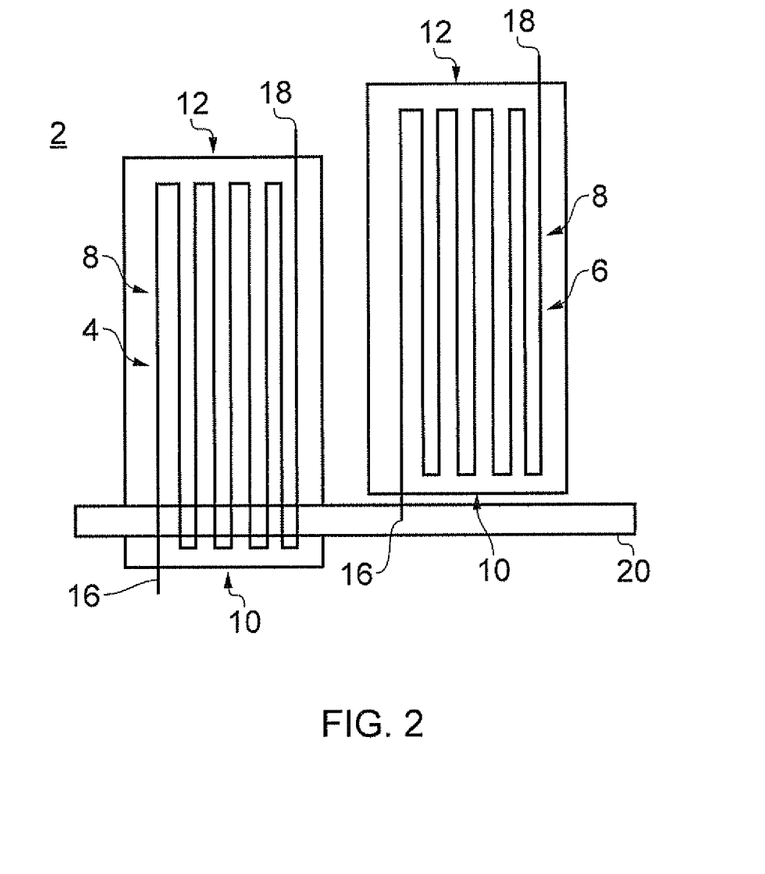
FIG. 2 is a plan view of the strain gauge assembly with the wave pulse having entered the first strain gauge.

In use, a stress wave 20 approaches the strain gauge assembly 2 at a speed C commensurate with the wave type and material properties of the test component. As shown in FIG. 2, the stress wave 20 impinges on the first strain gauge 4 before reaching the second strain gauge 6 because of the offset $d_{off}$ between the first and second strain gauges 4, 6. The stress wave 20 causes a small portion of the first strain gauge 4 to be placed under tension or compression thus changing the resistance of the conductor 14 and producing a signal.

Figure 3:
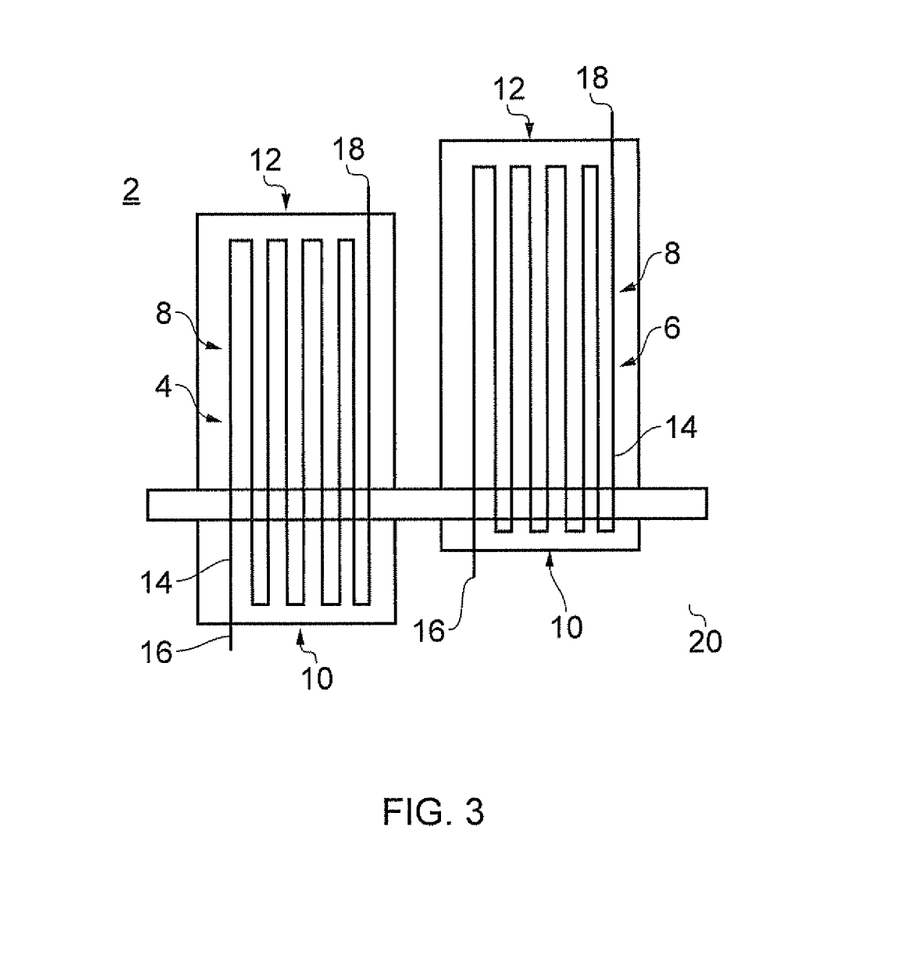
FIG. 3 is a plan view of the strain gauge assembly with the wave pulse having entered the second strain gauge.

After a time interval ΔT, the stress wave 20 reaches the second strain gauge 6 and similarly the stress wave 20 causes a small portion of the second strain gauge 6 to be placed under tension or compression thus changing the resistance of the conductor 14 and producing a signal.

Figure 4:
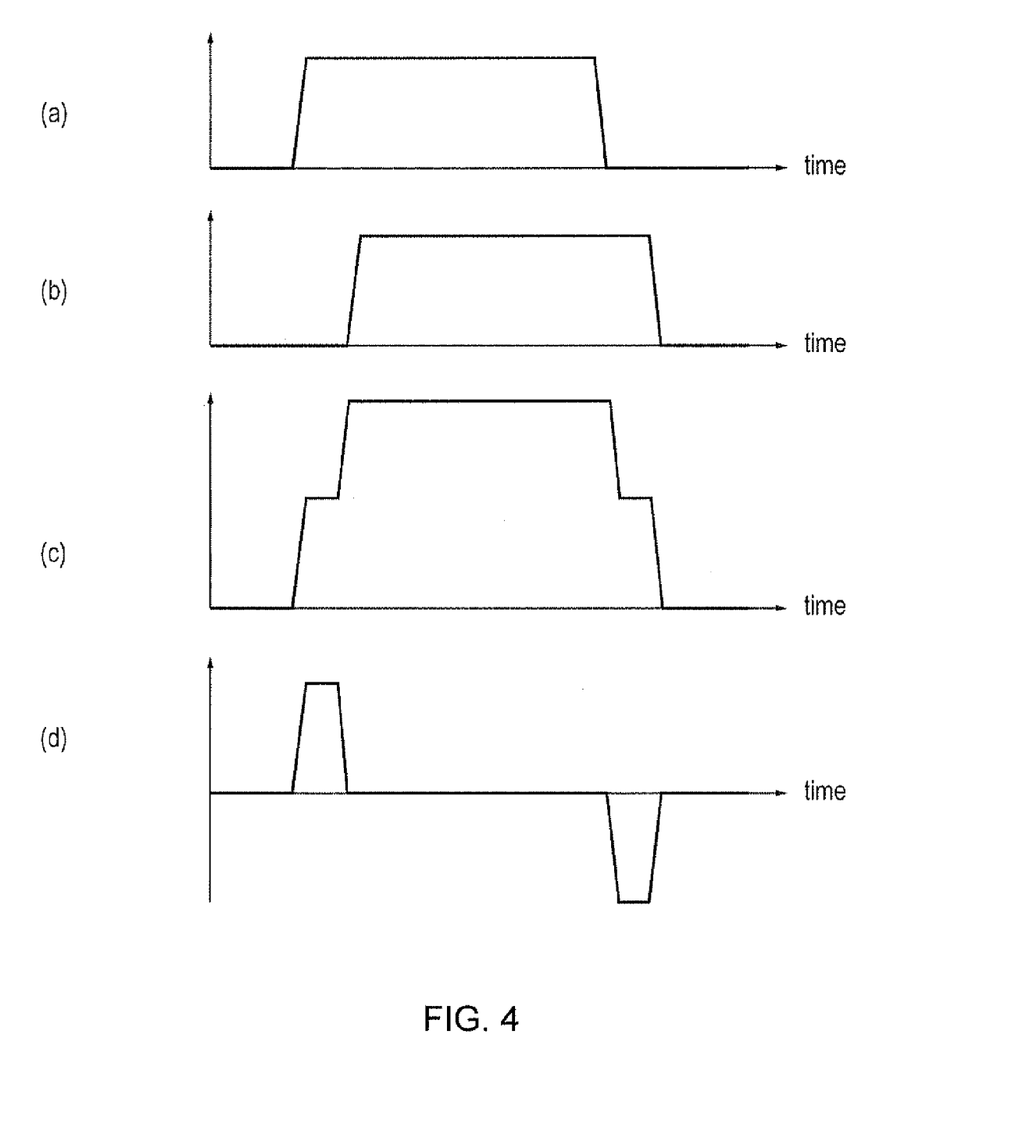
FIG. 4(a) is a graph showing the signal output by the first strain gauge as a function of time.
FIG. 4(b) is a graph showing the signal output by the second strain gauge as a function of time.
FIG. 4(c) is a graph showing the processed signals from the first and second strain gauges, where the signals have been added to one another.
FIG. 4(d) is a graph showing the processed signals from the first and second strain gauges, where the signals have been subtracted from one another.

FIG. 4(a) shows a graph of the signal output by the first strain gauges 4 as a function of time. The signal output by the first strain gauge 4 has a ramp-up portion where the signal increases until the stress wave 20 is entirely within the first strain gauge 4. However, once the stress wave 20 is entirely within the first strain gauge 4, the reading plateaus at a constant level until the stress wave 20 begins to exit the area of the first strain gauge 4. At this point, the signal displays a ramp-down portion where the signal decreases to zero when the stress wave has completely exited the first strain gauge 4.

The signal from the second strain gauge 6 is shown in FIG. 4(b). The signal from the second strain gauge 6 is identical to that of the first strain gauge 4 but lags the signal of the first strain gauge 4 by the time interval ΔT.

The signals from the first and second strain gauges 4, 6 allow the time interval ΔT to be found. From this information, the speed C of the stress wave 20 can be determined since $C=d_{off}/\Delta T$. Furthermore, once the speed C of the stress wave 20 is known, its duration may be calculated from the duration of the ramp-up and/or ramp-down portions of the signal of the first and/or second strain gauges 4, 6, by multiplying the time to reach the maximum signal by the speed C. The amplitude of the signal therefore can be assessed in light of the duration of the stress wave 20 to provide an indication of the amplitude of the stress wave 20. The signals from the first and second strain gauges 4, 6 also indicate the direction of the stress wave 20 since the stress wave 20 arrives at the first strain gauge 4 before arriving at the second strain gauge 6.

To enable this information to be more easily extracted, the signals from the first and second strain gauges 4, 6 are processed by the signal processor in order to combine them. FIG. 4(c) shows the processed signals from the first and second strain gauges 4, 6, where the signals have been added to one other. The combined signal ramps up to a lower plateau as per the signal of the first strain gauge 4. This lower plateau has a duration which is equal to the time interval ΔT. After this time the contribution from the second strain gauge 6 causes the signal to again increase before reaching a higher plateau. When the stress wave 20 exits the first strain gauge the signal ramps down to the lower plateau, which again has a duration equal to the time interval ΔT, before ramping down to zero when the stress wave 20 exits the second strain gauge 6. The processed signal therefore provides a simple means of extracting the time interval ΔT.

FIG. 4(d) shows an alternative method of processing the signals from the first and second strain gauges 4, 6 where the signals are subtracted from one another. The combined signal ramps up to a plateau as per the signal of the first strain gauge 4. The plateau has a duration which is equal to the time interval ΔT. After this time the contribution from the second strain gauge 6 causes the signal to ramp down to zero. The signal remains at zero until the stress wave 20 exits the first strain gauge causing the signal to ramp down to a negative plateau, which again has a duration equal to the time interval ΔT. Following the negative plateau, the signal ramps up to zero when the stress wave 20 exits the second strain gauge 6. The processed signal therefore provides a simple means of extracting the time interval ΔT. Also, the positive first plateau and negative second plateau indicates that the stress wave 20 reached the first strain gauge 4 before reaching the second strain gauge 6 and therefore readily displays the direction of the stress wave 20.

A shock wave typically comprises a continuum of waves over a range of frequencies which, in general, have dispersive characteristics: the wave speed is a function of the wave frequency. More sophisticated signal processing may be employed to determine group and phase velocity, and to deduce the dispersion relation for the particular material and structure under test. It is believed that assemblies of more than two strain gauges may be necessary to make accurate assessments of these dispersive effects.

Figure 5:
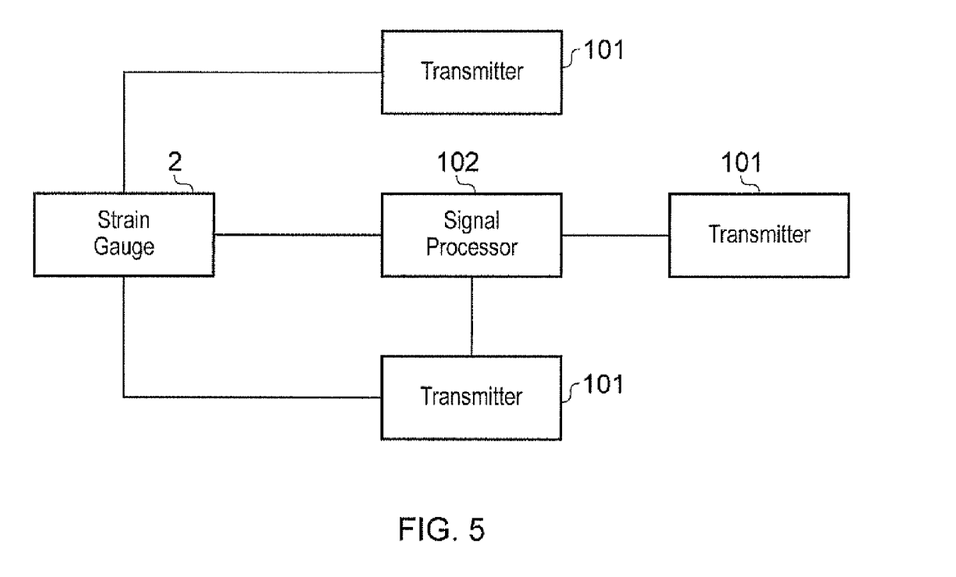
FIG. 5 depicts arrangements of strain gauge, signal processors and/or signal transmitters.

In a particular embodiment of the invention, the strain gauge assembly comprises a transmitter (not shown) for transmitting, for example using wireless communications techniques, the raw signals from the first and second strain gauges 4, 6, processed signals and/or determined properties to a receiver. This allows remote sensing of the strain of a component and thus can be used whilst the component is in service.

The power for the signal processor and/or transmitter can be harnessed from the energy of the stress wave 20 being measured, or from previous wave activity, using an energy conversion means. Where the energy of a previous wave activity is used it may be desirable to store the energy in an appropriate rechargeable battery or capacitor. Using stored energy may be desirable where the energy obtained from a single pulse is not sufficient or not available in time for it to be used immediately in the signal processor.

In an alternative embodiment of the invention, the first and second strain gauges 4, 6 are of different length. Therefore, one of the first and second ends 10, 12 of the first and second strain gauges 4, 6 can be aligned whilst the other of the first and second ends 10, 12 are offset from one another. Consequently, the stress wave 20 either enters or exits the first and second strain gauges 4, 6 at different times, allowing the time interval ΔT to be calculated.

A specific application of the present invention to a split Hopkinson bar test will now be described.

The Split Hopkinson bar test uses two lengths of bar arranged in series with a specimen sandwiched between the two bars. A longitudinal shock pulse is transmitted down a rod and the shock pulse is transmitted from the first bar, through the specimen, and into the second bar. The shape and material choice of the bar ensures that the wave pulse is almost entirely a wave guided 1-D compression or tension wave with well defined speed and behaviour. For specimens with more compliant material properties (e.g. composites), the bars can be constructed from lower stiffness materials. Usually they are of brass or steel; materials with good linear elastic properties. However using materials with lower stiffness usually means increasing issues of viscosity and other non-linear effects. Furthermore, this may contaminate the 1-D signal as a result of Poisson's effect (a wave pulse of radial expansion of the rod). To overcome these issues it is necessary to filter the signals, and the strain gauge assembly of the present invention could be a useful diagnostic and/or filter tool.

Although the present invention has been shown as having separate backing layers 8 for the first and second strain gauges 4, 6, in an alternative embodiment they may be integrally formed or mounted on an additional backing layer to join them to one another. Where the strain gauge assembly is to be mounted around the perimeter of a component which has a uniform cross-section along at least the length of the strain gauge assembly, it is useful to provide an alignment feature on the backing layer to assist in aligning the strain gauge assembly with a longitudinal axis of the component. The alignment feature may be the sides of the backing layer itself. For example, the backing layer may be sized to overlap when wrapped around the perimeter of the component so that the sides of the backing layer which extend around the perimeter are aligned when the assembly is aligned with the axis. Alternatively, the assembly may be sized so that the sides just meet when wrapped around the component. In this case, the sides which lie in the direction of the axis are parallel if the strain gauge assembly is aligned with the axis of the component. Instead of the edges serving as alignment features, lines or other indications may be printed or otherwise formed on the backing layer, but essentially function in the same manner as the sides of the backing layer. To assist in the alignment process, the backing layer may be transparent or translucent so that the alignment feature is still visible even when the other end of the backing layer has been wrapped over it. Such alignment features are particularly useful in the application of the strain gauge assembly in the split Hopkinson bar test described above.

Although additive and subtractive signal processing techniques have been described, other techniques could be used to allow useful information to be extracted from the signals of the first and second strain gauges 4, 6. For example, alternative signal processing techniques include FFT (fast Fourier transform) and other types of transform such as Chirp transform methods and wavelet methods.

The present invention has been described with reference to a strain gauge assembly 2 comprising first and second strain gauges 4, 6, however the invention may be employed using additional strain gauges to improve the accuracy of the technique. Where there are more than two strain gauges, each successive strain gauge may be offset by a greater amount. Alternatively, the strain gauges need not be arranged in such a staggered configuration and could be randomly offset. Furthermore, where there are more than two strain gauges not all strain gauges need be offset and some may be aligned. However, there must be at least one strain gauge which is offset from another strain gauge.

Where a large number of strain gauges are used there has to be an assumption that the wave front of the stress wave is comparatively wide, such that the front is parallel at the incidence with the gauges. However, the gauges can also be used to detect the presence of a curved wave front, and its shape, by cross-referencing the signals from multiple gauges.

The wave 20 may be a single pulse or a wave packet, however regardless of the type, the wave 20 should be short in duration such that it may be completely contained within the first and second strain gauges 4, 6. Such a wave is typical of a shock load event.

Although the present invention has been described with reference to conventional foil strain gauges, the invention may be applied to other types of strain gauge. For example, semiconductor strain gauges, such as piezoresistors, or fibre optic sensors may be used.

The invention claimed is:

1. A strain gauge assembly comprising:
a plurality of identical strain gauges arranged in a parallel side-by-side relationship, each having a first end and a second end and sides extending between the first end and the second end, and a length of one of the sides exceeding a length of the first end and the second end,
wherein a side of a first one of the strain gauges faces a side of a second one of the strain gauges; and
the first and second ends of the first one of the strain gauges are not in alignment with and are offset from the first and second ends of the second one of the strain gauges.

2. A strain gauge according to claim 1, wherein the plurality of strain gauges are arranged as a pair or in pairs.

3. A strain gauge assembly as claimed in claim 1, wherein the plurality of strain gauges are substantially parallel with one another.

4. A strain gauge assembly as claimed in claim 1, wherein the offset is a predetermined distance.

5. A strain gauge assembly as claimed in claim 1, wherein the offset is a fraction of the length of the gauges along the length of the gauges.

6. A strain gauge assembly as claimed in claim 1, further comprising a flexible backing layer, wherein the plurality of strain gauges are mounted on the backing layer.

7. A strain gauge assembly as claimed in claim 6, wherein the backing layer comprises an alignment feature for aligning the strain gauge assembly with an axis of a test component.

8. A strain gauge assembly as claimed in claim 7, wherein the alignment feature comprises two parallel features on the backing layer which align when the strain gauge assembly is aligned with the axis of the test component.

9. A strain gauge assembly as claimed in claim 8, wherein the parallel features are markings on the backing layer.

10. A strain gauge assembly as claimed in claim 1, further comprising a signal processor which processes signals from the plurality of strain gauges.

11. A strain gauge assembly as claimed in claim 10, wherein the signal processor determines properties of a stress wave in a test component.

12. A strain gauge assembly as claimed in claim 11, wherein the properties of the strain wave determined by the signal processor are one or more of: speed, duration, amplitude, shape, group velocity, phase velocity and dispersion relation.

13. A strain gauge assembly as claimed in claim 10, wherein the signal processor is powered by a stress wave measurable by the plurality of strain gauges.

14. A strain gauge assembly as claimed in claim 1, further comprising a transmitter which transmits signals from the plurality of strain gauges to a receiver.

15. A strain gauge rosette comprising one or more strain gauge assemblies as claimed in claim 1.

16. A component comprising a strain gauge assembly as claimed in claim 1, wherein the strain gauge assembly is printed onto the component.

17. A method for determining strain properties in a test component, comprising:
providing a plurality of strain gauges, each having a first end and a second end and sides extending between the first end and the second end, a length of one of the sides exceeding a length of the first end and the second end;
arranging the plurality of strain gauges on the test component in a side-by-side relationship such that at least one of the first or second end of one of the plurality of strain gauges is offset from at least one of a corresponding first or second end of another of the plurality of strain gauges and the plurality of strain gauges are aligned to measure a stress wave in the component.

18. A method as claimed in claim 17, further comprising: processing signals from the plurality of strain gauges.

19. A method as claimed in claim 18, wherein processing the signals comprises adding or subtracting the signals from the plurality of strain gauges.

20. A method for determining strain properties in a test component, comprising:

providing a plurality of strain gauges, each having a first end and a second end and sides extending between the first end and the second end;

arranging the plurality of strain gauges on the test component in a side-by-side relationship such that at least one of the first or second end of one of the plurality of strain gauges is offset from at least one of a corresponding first or second end of another of the plurality of strain gauges by a predetermined amount, a side of the first strain gauge coinciding with a side of the second strain gauge everywhere except for a portion corresponding to the predetermined amount, and the plurality of strain gauges are aligned to measure a stress wave in the component; and processing signals from the plurality of strain gauges by adding or subtracting the signals from the plurality of strain gauges.

21. A method as claimed in claim 20, wherein the properties of the strain wave determined are one or more of: speed, duration, amplitude, and shape.

22. A method for determining strain properties in a test component, comprising: providing a plurality of identical strain gauges, each having a first end and a second end and sides extending between the first and second end, a length of one of the sides exceeding a length of the first end and the second end; arranging the plurality of strain gauges on the test component in a parallel side-by-side relationship such that a side of a first strain gauge faces a side of a second strain gauge; the first and second ends of a first strain gauge is not in alignment and is offset from the corresponding first and second ends of the second strain gauge and the plurality of strain gauges are aligned to measure a stress wave in the component.

23. A method as claimed in claim 22, further comprising: processing signals from the plurality of strain gauges.

24. A method as claimed in claim 23, wherein processing the signals comprises adding or subtracting the signals from the plurality of strain gauges.

25. A method as claimed in claim 20, further comprising: determining properties of a stress wave in the test component.

* * * * *